United States Patent [19]

Bergström

[11] 4,274,494
[45] Jun. 23, 1981

[54] METHOD AND DEVICE FOR SETTING THE DIRECTION AND/OR THE INCLINATION OF AN ELONGATED ROCK DRILLING APPARATUS

[75] Inventor: Claes-Gustav Bergström, Saltsjöbaden, Sweden

[73] Assignee: Atlas Copco Aktiebolag, Nacka, Sweden

[21] Appl. No.: 897,515

[22] Filed: Apr. 18, 1978

[30] Foreign Application Priority Data

May 16, 1977 [SE] Sweden .............................. 7705669
Aug. 4, 1977 [SE] Sweden .............................. 7708873

[51] Int. Cl.³ .......................... E21B 7/02; E21B 7/04
[52] U.S. Cl. .................................. 173/2; 33/366; 91/419; 173/43; 248/550
[58] Field of Search .................. 33/365, 366; 89/41 B, 89/41 CE; 91/419; 172/4.5; 173/1, 2, 20, 21, 43; 182/2; 248/550; 318/489

[56] References Cited

U.S. PATENT DOCUMENTS

| | | | |
|---|---|---|---|
| 2,134,426 | 10/1938 | Wood | 91/419 X |
| 3,094,796 | 6/1963 | Atchley | 172/4.5 |
| 3,113,283 | 12/1963 | Fliegler et al. | 338/46 |
| 3,303,589 | 2/1967 | Rivinius | 172/4.5 |
| 3,564,531 | 2/1971 | Burgin | 33/366 X |
| 3,721,304 | 3/1973 | Hanson | 173/2 |
| 3,824,699 | 7/1974 | Lenz et al. | 33/366 X |
| 3,876,309 | 4/1975 | Zicaro et al. | 33/366 X |
| 3,896,885 | 7/1975 | Dahlstrom et al. | 173/43 X |
| 3,975,831 | 8/1976 | Jysky et al. | 33/366 X |
| 4,022,284 | 5/1977 | Crow | 173/2 |

FOREIGN PATENT DOCUMENTS

| | | |
|---|---|---|
| 106726 | 8/1973 | Sweden . |
| 148330 | 10/1973 | Sweden . |
| 362113 | 11/1973 | Sweden . |
| 17840 | 12/1975 | Sweden . |
| 1325240 | 8/1973 | United Kingdom . |

*Primary Examiner*—Lawrence J. Staab
*Attorney, Agent, or Firm*—Frishauf, Holtz, Goodman & Woodward

[57] ABSTRACT

An elongated rock drilling apparatus is swingable by positioning power means. Set values of inclination and direction of the rock drilling apparatus are set by prepositioning a first pendulum device relative to the rock drilling apparatus. According to one aspect of the invention the actual values of the inclination and direction of the rock drilling apparatus in perpendicular directions are sensed by means of said first pendulum device. According to another aspect of the invention the actual values of the inclination and direction of the rock drilling apparatus are sensed by means of a second pendulum device. Means are provided for automatically bringing the rock drilling apparatus to a position in which set and actual values of inclination and direction coincide.

12 Claims, 8 Drawing Figures

U.S. Patent  Jun. 23, 1981  Sheet 1 of 6  4,274,494
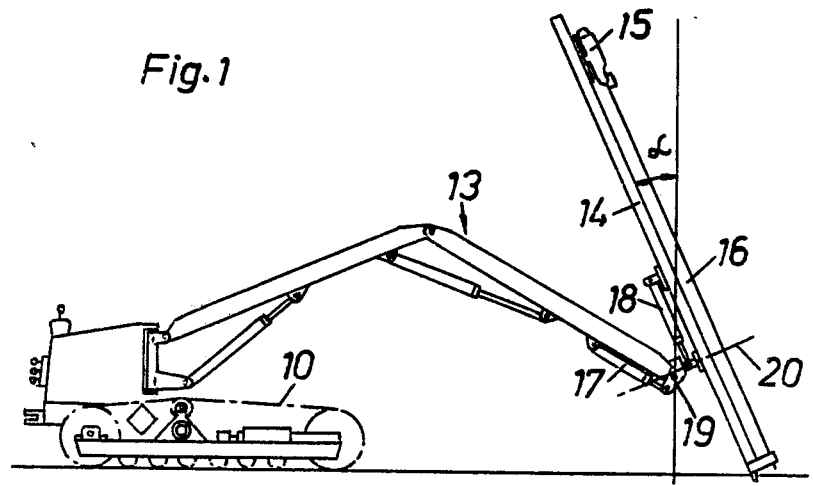
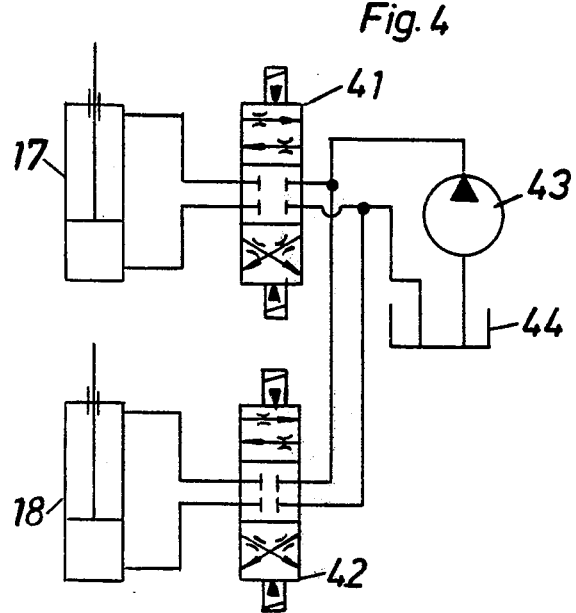
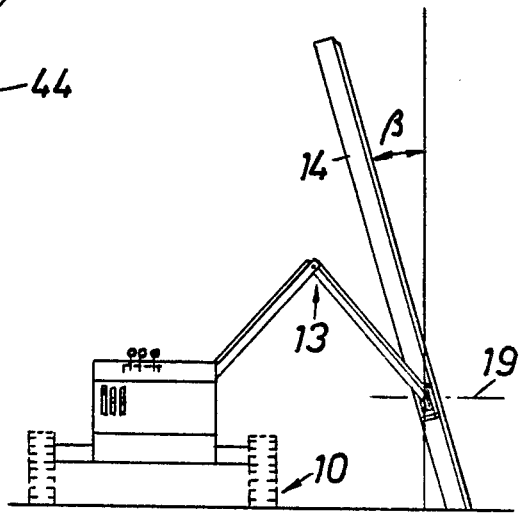

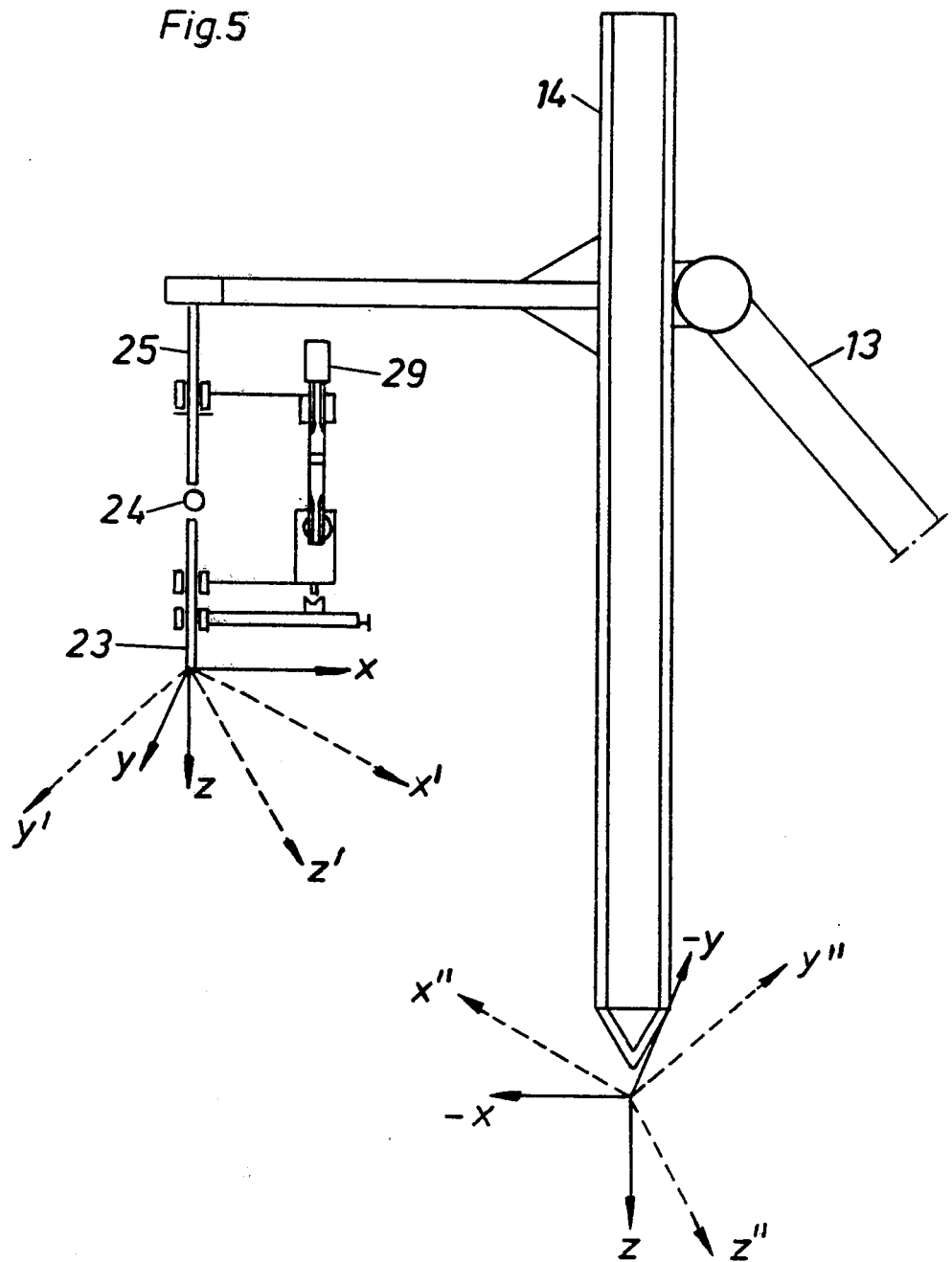

METHOD AND DEVICE FOR SETTING THE DIRECTION AND/OR THE INCLINATION OF AN ELONGATED ROCK DRILLING APPARATUS

REFERENCE TO PATENTS AND APPLICATIONS PERTINENT TO THE INVENTION

Swedish Pat. Nos. 362 113, 7301784-0 and 7310672-6, Swedish patent application 7314833-0, U.S. Pat. Nos. 3,113,283 and 3,896,885 and British Pat. No. 1,325,240.

BACKGROUND OF THE INVENTION

The present invention concerns a method and a device for setting the direction and/or the inclination of an elongated rock drilling apparatus. The elongated rock drilling apparatus is swingable by means of at least one positioning power means. The inclination of the elongated rock drilling apparatus is sensed by means of pendulum-type angle sensing means.

Both manual and automatic devices for positioning an elongated rock drilling apparatus to a desired direction are previously known. The manual devices comprise a pendulum or level system attached to the rock drilling apparatus. In a pendulum system the deviation or deflection of a pendulum is read on a graduated scale and in a level system the position of a bubble is watched in a reading window.

The present invention relates to the automatically operating type of positioning devices. One example of such prior art is disclosed in U.S. Pat. No. 3,896,885 wherein the device comprises inclination and course indicators and the inclination in predetermined directions is obtained by trigonometric calculations. Another example is disclosed in British Pat. No. 1,325,240 wherein in a first step the rock drilling apparatus is positioned manually to a desired drilling direction whereupon a mounting bracket or carrying member for a pendulum is positioned manually such that its vertical symmetry line coincides with the vertical line in which position, thus, the carrying member is horizontal. Swinging of the drill boom causes the pendulum to transmit signals to positioning power means which bring the rock drilling apparatus back to its manually prepositioned direction.

One object of the present invention is to provide a device by which the rock drilling apparatus can be rapidly positioned for drilling of holes having desired inclination in different directions.

Another object of the invention is to provide remote control of the inclination setting, for instance from an operator's cab. Remote control is possible and desired particularly in large drill rigs.

SUMMARY OF THE INVENTION

According to one aspect of the invention there is provided a method of setting at least one of the direction and the inclination of an elongated rock drilling apparatus, said rock drilling apparatus being swingable by means of at least one positioning power means, comprising setting the set value of the inclination of the rock drilling apparatus by prepositioning a first carrying member to an initial position which corresponds to the set value of the inclination of the rock drilling apparatus, said first carrying member carrying a first pendulum device, sensing the inclination of the rock drilling apparatus by means of either said first pendulum device or a second pendulum device, said second pendulum device being mounted on a second carrying member, which is isolated from the movement of the rock drilling apparatus, generating error signals corresponding to the difference between actual value and set value of the inclination of the rock drilling apparatus by means of at least one of said first and second pendulum devices, and bringing the rock drilling apparatus automatically to a position where the set value of the inclination of the rock drilling apparatus is obtained by actuating the positioning power means by means of the error signals.

According to another aspect of the invention there is provided a device for setting at least one of the direction and the inclination of an elongated rock drilling apparatus, said rock drilling apparatus being swingable by means of at least one positioning power means, comprising a first pendulum device, a first carrying member for carrying said first pendulum device, means associated with said first carrying member adapted to make possible a prepositioning of said first carrying member relative to the rock drilling apparatus to an initial position which corresponds to the set value of the inclination of the rock drilling apparatus, at least one of said first pendulum device and a second pendulum device adapted to sense the inclination of the rock drilling apparatus, at least one of said first and second pendulum devices being adapted to generate error signals corresponding to the difference between actual value and set value of the inclination of the rock drilling apparatus, and means for actuating the positioning power means by means of said error signals to automatically bring the rock drilling apparatus to a position where the desired inclination of the rock drilling apparatus is obtained.

The invention is described in detail in the following description with reference to the accompanying drawings in which two embodiments are shown by way of example. It is to be understood that these embodiments are only illustrative of the invention and that various modifications thereof may be made within the scope of the claims following hereinafter.

BRIEF DESCRIPTION OF THE DRAWINGS

FIG. 1 illustrates diagrammatically a side view of a mobile drill rig provided with a device according to the invention.

FIG. 2 is a diagrammatic view of the drill rig in FIG. 1 from the rear.

FIG. 4 illustrates the adjustment of the positioning power means of the elongated rock drilling apparatus by means of the angle sensing means in FIG. 3.

FIG. 5 illustrates the relationship between the prepositioning of the angle sensing means in FIG. 3 and the subsequent turning of the rock drilling apparatus caused by this prepositioning.

DETAILED DESCRIPTION OF THE PREFERRED EMBODIMENTS

Figure 3:
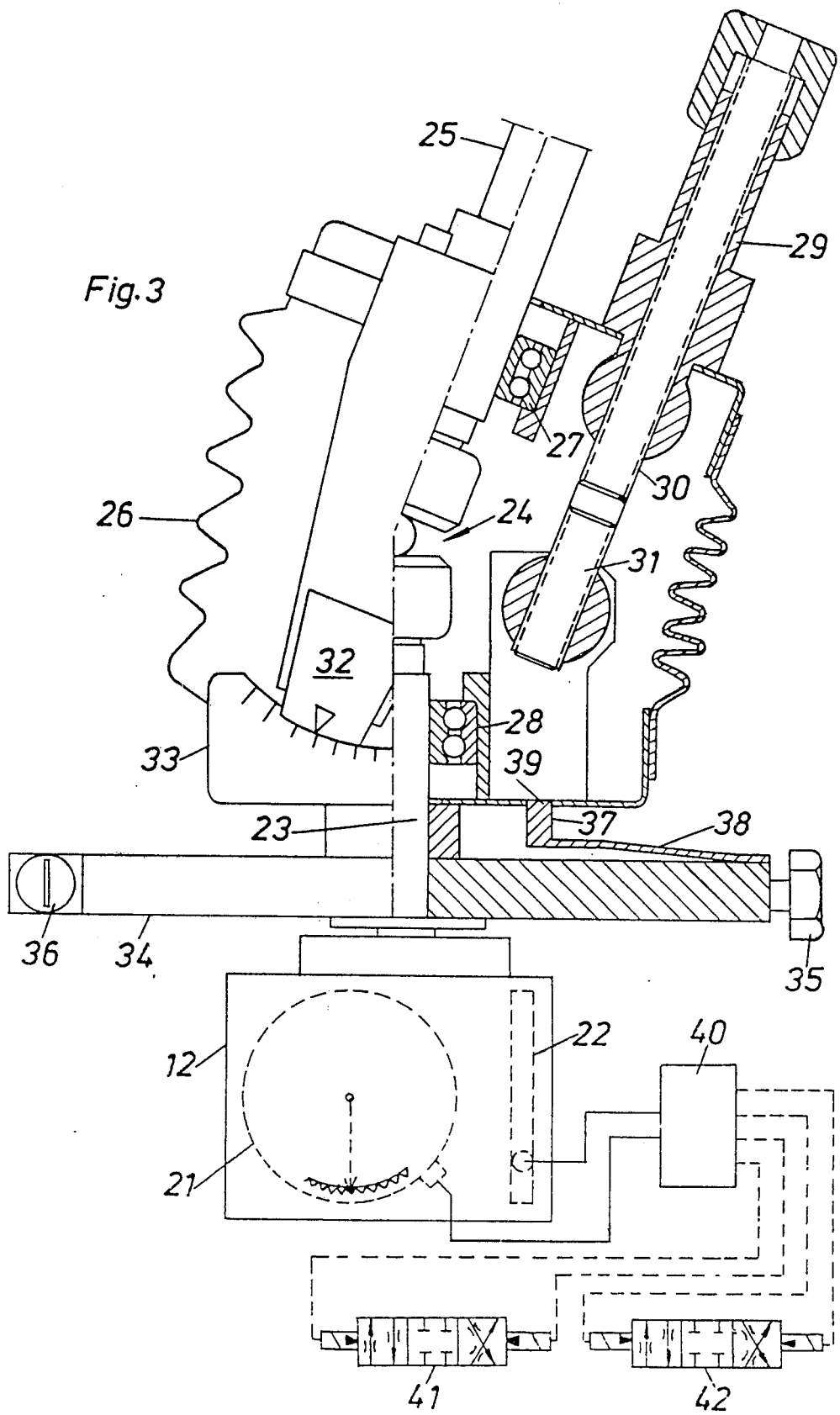
FIG. 3 shows partly in section the angle sensing means in one embodiment of a device according to the invention.

The drill rig 10 shown in FIGS. 1 and 2 of conventional construction. The drill rig supports swingably a drill boom 13, which carries an elongated rock drilling apparatus comprising a feed bar 14 and a rock drilling machine 15. The rock drilling machine is slidably guided on the feed bar and rotates a drill rod 16 and delivers impacts thereagainst. The feed bar can be swung about an axis 19 by means of a hydraulic cylinder 17 for adjusting the tilting angle $\alpha$ of the feed bar relative to the vertical line. The feed bar can also be swung about an axis 20 which is perpendicular to the axis 19 by means of a hydraulic cylinder 18 for adjusting the turning angle $\beta$ of the feed bar relative to the vertical line.

In the embodiment shown in FIGS. 3–5, the device for setting the inclination and/or direction of the feed bar comprises two electrical vertical sensing instruments or pendulum transducers 21, 22. An example of a typical such instrument is disclosed in U.S. Pat. No. 3,113,283. Although being illustrated as two pendulums it is to be understood that the pendulum system may comprise only one single pendulum mounted for swinging in two planes at right angles to each other. Such single pendulum may be mounted for pivoting as well as for tilting movement, i.e. having its pivots above and below, respectively, the weight. An example of such an instrument is disclosed in British Pat. No. 1,325,240. The pendulum transducers 21, 22 are firmly mounted at right angles to each other inside an instrument housing or carrying member 12. The instrument housing 12 is attached to a shaft 23 which is perpendicular to the instrument housing. The shaft 23 is connected to a shaft 25 over a universal joint 24. The shaft 25 is fixed relative to the feed bar 14, preferably parallel thereto. A casing 26 of bellows-type is turnable around the shafts 23, 25 over roller bearings 27, 28. The angle between the shafts 23, 25 at the universal joint 24 can be adjusted by means of an adjusting screw 29 which is provided with portions 30, 31 having opposite thread directions. The casing 26 is provided with a pointer 32. The pointer 32 cooperates with a graduated scale 33 which is fixed relative to the shaft 23, thereby indicating the turning angle about the joint 24.

A plate 34 is turnable around the shaft 23 and can be locked relative thereto by means of a lock screw 35. The plate 34 carries a collimator sight 36. The plate 34 can be fixed relative to the casing 26 by means of a plate spring 38 and a pin 37 thereon which can snap into a hole 39 in the bottom of the casing 26.

The set value of the inclination of the feed bar 14 in a vertical plane passing the feed bar and the set value of the direction of this vertical plane can be preset by means of the device in FIG. 3. The desired value of the inclination is set on the graduated scale 33 by means of the adjusting screw 29. The lock screw 35 is then undone, whereupon desired direction of the vertical plane through the feed bar is set by aiming toward a specific reference object in the surrounding territory by means of the collimator sight 36. The plate 34 is then locked whereupon the casing 26 is turned until the pin 37 snaps into the hole 39.

The plate 34 and thus also the instrument housing 12 fixed with respect thereto is now prepositioned to an initial position which deviates from a horizontal position. The requirement which now must be met in order to obtain desired inclination and direction is that the carrying member of the pendulum system, i.e. the instrument housing 12, and thus also the plate 34 is brought back to a horizontal position.

Due to the inclined position of the carrying member 12 caused by its prepositioning error signals are generated by the pendulum transducers 21, 22. The error signals correspond to the inclination of the carrying member 12 and represent the deviation between actual value and set value of the inclination and direction of the feed bar.

The error signals from the pendulum transducers 21, 22 are transmitted to an electronic control unit 40. The unit 40 produces control signals which are transmitted to electrohydraulic servo valves 41, 42 which control the movements of the positioning power means, i.e. the hydraulic cylinders 17, 18. Upon adjustment of the servo valves 41, 42 hydraulic fluid is conducted from a pump 43 to the hydraulic cylinders 17, 18 and from these cylinders back to a tank 44. A control signal caused by the deflection of the carrying member 12 from the horizontal plane and transmitted to one of the valves 41, 42 adjusts this valve in a manner such that the hydraulic cylinders 17, 18 are caused to counteract the deviation until the deviation is zero, i.e. desired inclination and direction of the feed bar is obtained. FIG. 3 shows the position of the instrument housing 12 and the pendulum transducers 21, 22 in their final position after completed positioning.

FIG. 5 illustrates the co-ordinate transformation which occurs during positioning of the feed bar. In its final position the instrument housing 12 is in alignment with a horizontal plane xy, and the shaft 23 coincides with the z-axis of the system of co-ordinates. If the shaft 25 is aligned with the shaft 23, as shown in FIG. 5, the feed bar 14, then extends in the direction of the z-axis. Suppose now that the instrument housing 12 is inclined and turned and that the xyz-system follows the movement of the housing such that the xyz-system is transformed to a $x^I y^I z^I$—system. In order to bring the instrument housing 12 back to its horizontal position the feed bar 14 must be swung in such a way that a system of coordinates associated with and following the feed bar is transformed to a $x^{II} y^{II} z^{II}$—system. It can be shown that the requirement which must be met in order to obtain accurate positioning of the feed bar with respect to inclination and direction is that $-x^I$; $-y^I$; $z^I$ coincide with $x^{II}$; $y^{II}$; $z^{II}$.

Figure 6:
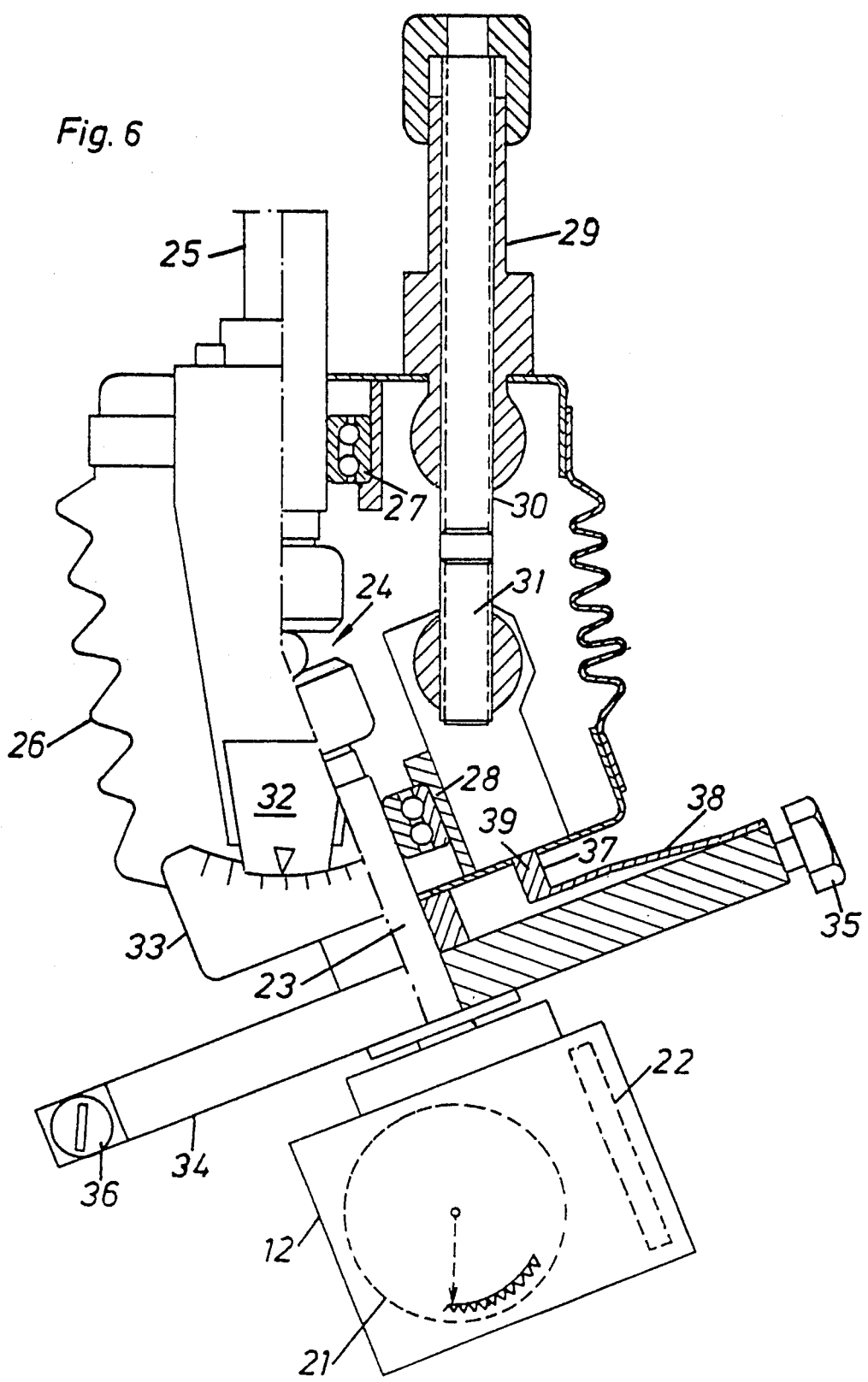
FIG. 6 shows partly in section an angle sensing means in another embodiment of a device according to the invention.
Figure 7:
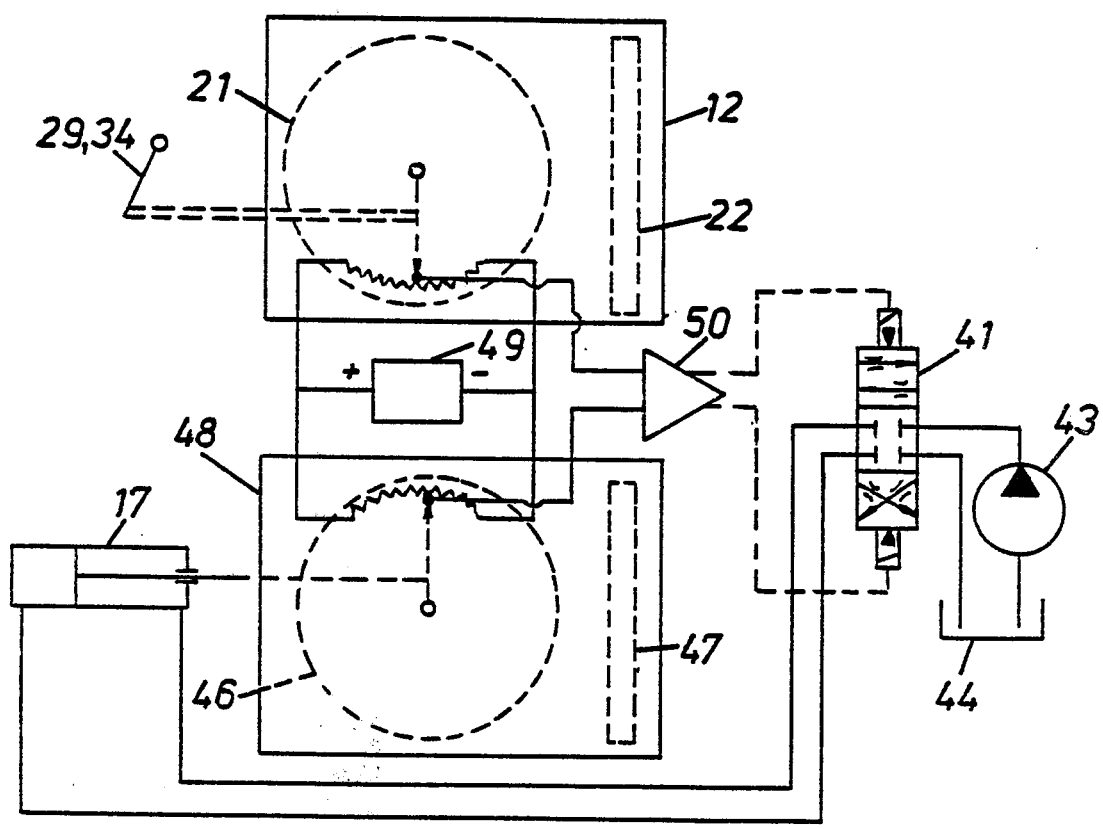
FIG. 7 illustrates the adjustment of the positioning power means of the elongated rock drilling apparatus by means of the angle sensing means in FIG. 6.
Figure 8:
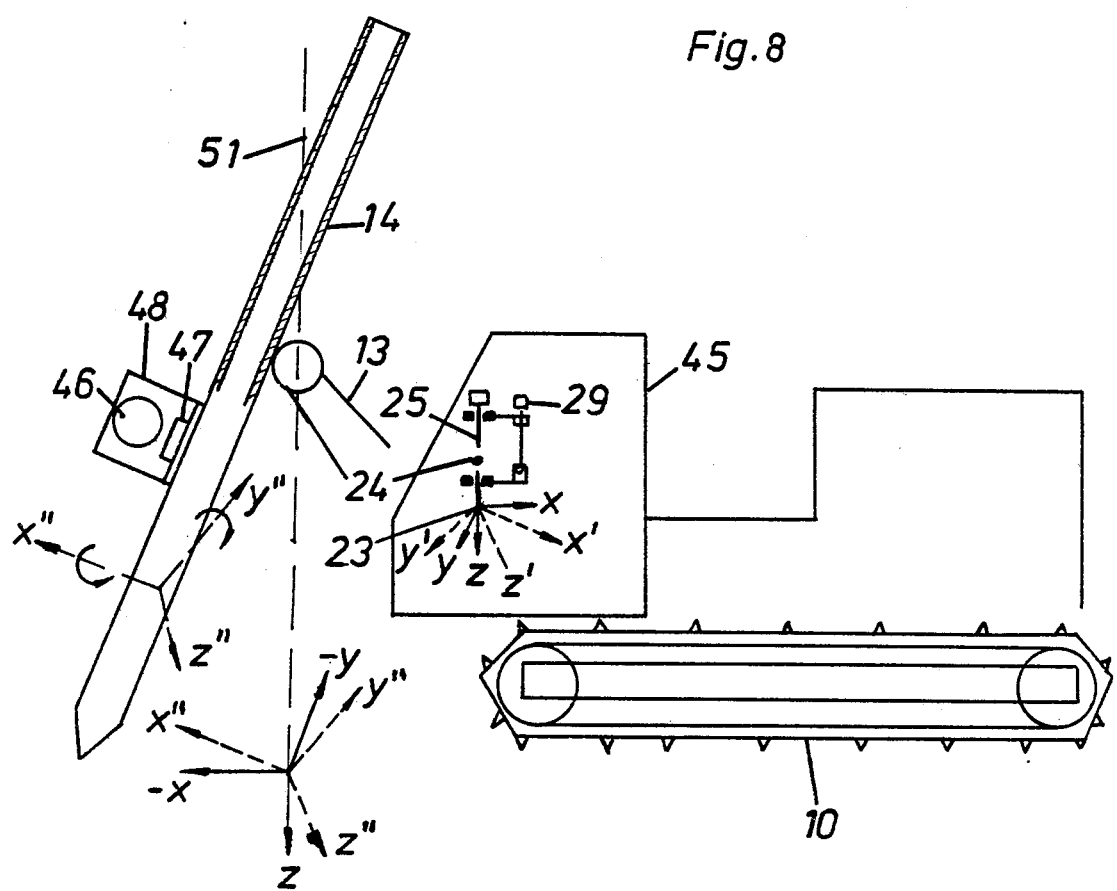
FIG. 8 illustrates the coordinate transformation which occurs during the positioning of the rock drilling apparatus by means of the angle sensing means in FIGS. 6 and 7.

In the embodiment shown in FIGS. 6–8, the device for setting the inclination and/or direction of the feed bar comprises two electrical vertical sensing instruments or pendulum transducers 46, 47, for instance of the type shown in United States Pat. No. 3,113,283. It is to be understood that the pendulum system may comprise only one single pendulum mounted for swinging in two planes at right angles to each other, and for pivoting as well as for tilting movement. The pendulum transducers 46, 47 are firmly mounted at right angles to each other inside an instrument housing or carrying member 48. The instrument housing 48 is unmovably attached to the feed bar 14. The pendulum transducer 46 is mounted in such a way that it is in the vertical plane which passes through the axis 20, thereby sensing the tilting angle $\alpha$ of the feed bar. Consequently, the pendulum transducer 47 senses the turning angle $\beta$.

The device further comprises two electrical pendulum transducers 21, 22 which are mounted at right angles to each other inside an instrument housing or carrying member 12. The instrument housing 12 is mounted at a distance from the feed bar 14 so that it does not follow the movement of the feed bar. In drill rigs having an operator's cab, the instrument housing 12 is preferably mounted therein. FIG. 8 illustrates such mounting inside a cab 45. The operator, then, can position the feed bar without leaving the cab.

The device in FIG. 6 is the same as the device in FIG. 3 and is therefore not described in detail. The shaft 25 must always be vertical, i.e. compensated for any occurring inclination or obliquity of the framing. Such compensation may be carried out either manually, for example by means of a circular water level, or automatically by means of a levelling system of a type known per se.

The set value of the inclination of the feed bar 14 in a vertical plane passing the feed bar and the set value of the direction of this vertical plane can be preset by means of the device in FIG. 3. The desired value of the inclination is set on the graduated scale 33 by means of the adjusting screw 29. The lock screw 35 is then undone whereupon desired direction of the vertical plane through the feed bar is set by aiming toward a specific reference object in the surrounding territory by means of the collimator sight 36. The plate 34 is then locked whereupon the casing 26 is turned until the pin 37 snaps into the hole 39.

The plate 34 and thus also the instrument housing 12 fixed with respect thereto is now prepositioned to an initial position which corresponds to the set value of the inclination and direction of the feed bar 14.

The pendulum transducers 21, 46 are electrically connected to each other in such a way that they generate an error signal which corresponds to the difference between actual value and set value of the tilting angle $\alpha$. In corresponding way the pendulum transducers 22, 47 are arranged to generate an error signal which corresponds to the difference between actual value and set value of the turning angle $\beta$.

FIG. 8 illustrates the co-ordinate transformation which occurs during the automatic positioning of the feed bar. In its horizontal position the instrument housing 12 is in alignment with a horizontal plane xy, and the shafts 23 and 25 coincide with the z-axis of the system of co-ordinates. Suppose now that the instrument housing 12 is prepositioned to an initial position as above-described and that the xyz-system follows the movement of the housing such that the xyz-system is transformed to a $x^1 y^1 z^1$—system. The requirement which must be met in order to obtain a desired direction of the feed bar is that the feed bar is swung in such a way that a system of co-ordinates which follows the feed bar is transformed to a $x^{II} y^{II} z^{II}$—system. The feed bar 14 is in a reference position when it is in alignment with the vertical line 51 and thus runs along the z-axis of the xyz-system. It can be shown that the requirement which must be met in order to obtain accurate positioning of the feed bar with respect to inclination and direction is that $-x^1$; $-y^1$; $z^1$ coincide with $x^{II}$; $y^{II}$; $z^{II}$.

FIG. 7 illustrates how the signals from the pendulum transducers 46, 47 which are connected to the feed bar are compared with the signals from the respective reference transducers 21, 22 and how the hydraulic cylinders 17, 18 are actuated by means of the error signals. By prepositioning the instrument housing 12 by means of the adjusting screw 29 and the plate 34 a signal is emitted from the pendulum transducer 21. This signal is compared with a signal from the pendulum transducer 46. The pendulum transducers 21, 46 are connected to a reference voltage source 49. Any arising error signal is amplified in a servo amplifier 50. A control signal is emitted from the amplifier 50 to an electro-hydraulic valve 41 which is associated with the hydraulic cylinder 17. Upon adjustment of the valve 41 oil is conducted from a pump 43 to the hydraulic cylinder 17 wherefrom return oil is conducted to a tank 44. The hydraulic cylinder 17 swings the feed bar 14 until the error signal which is transmitted to the servo amplifier 50 is zero. The set value of the tilting angle $\alpha$ is then obtained.

The pendulum transducers 22, 47 are in corresponding way coupled to control the hydraulic cylinder 18 in such a way that the cylinder 18 swings the feed bar until the set value of the turning angle $\beta$ is obtained.

In the illustrated embodiment the shaft 25 is adjusted to a vertical direction before the desired drilling direction is set. In an alternative embodiment, however, the shaft 25 can be fixed relative to the drill rig. The drill rig is then provided with suitable means for sensing the obliquity of the rig, such as a further couple of pendulum transducers connected to the rig. These sensing means emit signals which adjust the error signals which are generated by the pendulum transducers 21, 46; 22, 47 before the error signals are caused to act on the hydraulic cylinders 17, 18.

What I claim is:

1. A device for setting the inclination of an elongated rock drilling apparatus (14, 15), relative to two axes (19, 20) comprising:

at least one positioning power means (17, 18) coupled to said rock drilling apparatus for swinging said rock drilling apparatus about two axes (19, 20) which are at right angles to each other, said at least one positioning power means including an electro-hydraulic valve means (41), a first pendulum device (46, 47) adapted to sense the inclination of the rock drilling apparatus relative to said two axes and carried by a first carrying member (48) which is immovably connected to the rock drilling apparatus, a second pendulum device (21, 22) carried by a second carrying member (12) which is isolated from the movement of the rock drilling apparatus, each of the pendulum devices (46, 46, 21, 22) comprising two pendulum transducers mounted at right angles to each other, said pendulum transducers being adapted to follow a respective carrying member (48, 12) during its movement, one of the pendulum transducers (46, 47) which are connected to the rock drilling apparatus sensing the inclination of the rock drilling apparatus relative to one of said two axes and the other of said pendulum transducers (46, 47) which are connected to the rock drilling apparatus sensing the inclination of the rock drilling apparatus relative to the other of said two axes, said second pendulum device (21, 22) being carried by a substantially vertical first shaft (25) via a second shaft (23), said second shaft being pivotally connected to said first shaft and substantially perpendicular to said second carrying member, pre-setting means (29–36) associated with said second carrying member (12) adapted to make possible a prepositioning of said second carrying member relative to the rock drilling apparatus to an initial position which corresponds to the set value of the inclination of the rock drilling apparatus (14, 15), relative to said two axes said presetting means including:

inclination selecting means (29-33) for presetting the tilting angle (2) of the rock drilling apparatus (14, 15) in a vertical plane passing the rock drilling apparatus by adjusting the angle between said first (23) and second (25) shafts, and direction selecting means (34-36) including a turnable sighting means (36) which is turnable about said first shaft (23) for presetting the turning angle (β) of the rock drilling apparatus relative to a vertical line, means (37-39) for indexing said turnable sighting means (36) relative to said inclination selecting means (29-33) in a predetermined mutual turning position, journalling means (27, 28) for journalling said inclination selecting means (29-33) turnably about said first (23) and second (25) shafts, said pendulum devices (46, 47; 21, 22) being adapted to generate electrical error signals corresponding to the difference between actual value and set value of the turning and tilting angles, respectively, of the rock drilling apparatus (14, 15), and means for actuating said electro-hydraulic valve means (41) of the positioning power means (17, 18) by means of said electrical error signals to automatically bring the rock drilling apparatus (14, 15) and the first carrying member (48) to a position where the desired inclination of the rock drilling apparatus is obtained.

2. A rock drilling apparatus comprising:
a carrier (10, 13);
a feed beam (14) pivotally mounted to said carrier so as to be pivotable in a first plane about a first axis (19) and to be pivotable in a second plane about a second axis (20) that is at right angles to said first axis (19);
a rock drill (15) movable along said feed beam and arranged to drill a hole that is parallel with said feed beam;
first power means (17) coupled to said feed beam (14) to effect swinging of said feed beam about said first axis;
second power means (18) coupled to said feed beam (14) to effect swinging of said feed beam about said second axis;
a first member (25) affixed to said feed beam (14);
a second member (23,12) universally pivotably but nonrotatably carried by said first member (25);
indicating means (21, 22) affixed to said second member (23, 12) for indicating when an axis of said second member (23) is vertical;
means (29) for adjustment of said second member (23) relative to said first member (25) in order to adjust the angle between said axis of said second member (23) and an axis that is parallel with said feed beam (14); and
means (26,34) coupled to said second member (23) for swinging said second member about said axis that is parallel with said feed beam such that said axis of said second member (23) follows a conical path about said axis that is parallel with said feed beam;
said indicating means (21,22) comprising:
a first indicating device (21) arranged to indicate movements of said feed beam (14) in said first plane irrespective of the actual relative position between said first and second members (25 and 23, respectively); and
a second indicating device (22) arranged to indicate movements of said feed beam (14) in said second plane irrespective of the actual relative position between said first and second members.

3. The rock drilling apparatus of claim 2 wherein said means (26,34) for swinging said second member (23,12) comprises a sighting means (36).

4. The rock drilling apparatus of claim 3 wherein said sighting means (36) and said means (26,34) for swinging said second member (23,12) are selectively adjustable in position relative to said second member.

5. The rock drilling apparatus of claim 2 wherein said first member (25) comprises a first shaft and said second member (23,12) comprises a second shaft (23) universally pivotally connected to said first shaft but nonrotatable relative to said first shaft.

6. The rock drilling apparatus of claim 2 wherein said first and second indicating devices comprise respective pendulums coupled to control the respective first and second power means (17,18) to effect said swinging of said feed beam about said first and second axes, respectively.

7. The rock drilling apparatus of claim 6 wherein said pendulum devices (21,22) generate electric signals, and further comprising an electronic control unit (40), and electro-hydraulic valve means (41,42) associated with said first and second power means (17,18), said control unit being adapted to actuate said valve means to bring said second member (12) back to its horizontal position when it is displaced from said position in which said axis of said second member (23,12) is vertical.

8. The rock drilling apparatus of claim 6 or 7 wherein said pendulum devices comprise two pendulum transducers mounted at right angles to each other, said pendulum transducers being adapted to follow the second member (12) during its movement.

9. The rock drilling apparatus of claim 8 wherein one of said pendulum transducers is adapted to sense the inclination of the rock drilling apparatus relative to one of said first and second axes (19,20), and the other of said pendulum transducers is adapted to sense the inclination of the rock drilling apparatus relative to the other of said first and second axes.

10. The rock drilling device of claim 9 wherein said second member comprises a first shaft (23) and a carrying member (12) attached to said first shaft at right angles thereto; said first member (25) comprises a second shaft pivotally connected to said first shaft; said second shaft being connected to said rock drilling apparatus in substantially parallel relationship thereto.

11. The rock drilling apparatus of claim 10 wherein said means (29) for adjustment of said second member relative to said first member comprises means for presetting the inclination angle of the rock drilling apparatus in a vertical plane passing through the rock drilling apparatus by adjusting the angle between said first (23) and second (25) shafts; and comprising direction selecting means (34-36) for presetting the direction of the vertical plane.

12. The rock drilling apparatus of claim 11 wherein said direction selecting means (34-36) comprises a sighting means (36) which is turnable about said first shaft (23); and wherein said rock drilling apparatus further comprises means (27,28) for journalling the angle adjusting means (29-33) turnably about said first (23) and second (25) shafts; and means (37-39) for indexing said turnable sighting means (36) relative to said angle adjusting means in a predetermined mutual turning position.

* * * * *

UNITED STATES PATENT AND TRADEMARK OFFICE
CERTIFICATE OF CORRECTION

PATENT NO. : 4,274,494

DATED : June 23, 1981

INVENTOR(S) : Claes-Gustav BERGSTROM

It is certified that error appears in the above—identified patent and that said Letters Patent is hereby corrected as shown below:

Column 7, line 2, after "tilting angle" change "(2)" to --($\alpha$)--.

Signed and Sealed this

Twentieth Day of October 1981

[SEAL]

Attest:

GERALD J. MOSSINGHOFF

Attesting Officer     Commissioner of Patents and Trademarks